US010293797B2

(12) United States Patent
Kasten et al.

(10) Patent No.: US 10,293,797 B2
(45) Date of Patent: May 21, 2019

(54) METHOD FOR AVOIDING FALSE EXCITATIONS OF A SLIP CONTROL SYSTEM OF A BRAKE SYSTEM OF A VEHICLE

(71) Applicant: Continental Teves AG & Co. oHG, Frankfurt (DE)

(72) Inventors: Manuel Kasten, Hattersheim (DE); Henning Kerber, Darmstadt (DE); Jochen Müller, Marburg (DE); Mario Roszyk, Wehrheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 74 days.

(21) Appl. No.: 15/379,672

(22) Filed: Dec. 15, 2016

(65) Prior Publication Data

US 2017/0225666 A1 Aug. 10, 2017

Related U.S. Application Data

(63) Continuation of application No. PCT/EP2015/064973, filed on Jul. 1, 2015.

(30) Foreign Application Priority Data

Jul. 3, 2014 (DE) .................... 10 2014 212 984

(51) Int. Cl.
*B60T 8/173* (2006.01)
*B60T 8/172* (2006.01)
*B60T 17/22* (2006.01)

(52) U.S. Cl.
CPC .............. *B60T 8/173* (2013.01); *B60T 8/172* (2013.01); *B60T 17/22* (2013.01); *B60T 2210/14* (2013.01)

(58) Field of Classification Search
CPC ........... B60T 8/173; B60T 8/172; B60T 17/22
See application file for complete search history.

(56) References Cited

U.S. PATENT DOCUMENTS 3,880,474 A * 4/1975 Scharlack ........... B60T 8/17613
303/156
4,072,364 A * 2/1978 Gudat .................... B60T 8/172
303/195

(Continued)

FOREIGN PATENT DOCUMENTS

CN 102837693 A 12/2012
CN 103381799 A 11/2013

(Continued)

OTHER PUBLICATIONS

International Search Report and Written Opinion dated Sep. 15, 2015 from corresponding International Patent Application No. PCT/EP2015/064973.
German Search Report dated Mar. 12, 2015 for corresponding German Patent Application No. 10 2014 212 984.2.
Chinese Office Action dated Aug. 3, 2018 for corresponding Chinese Patent Application No. 201580035905.5.

*Primary Examiner* — Mary Cheung

(57) ABSTRACT

A method for avoiding false excitations of a slip control system comprises monitoring of a wheel speed signal for a predefined first monitoring time period for the start of a negative half-wave of an oscillation applied to a vehicle wheel, when a brake pressure gradient initiated by a brake start rises above a predetermined threshold. A ruck signal is derived from the wheel speed signal. An acceration signal is derived from the wheel speed signal during a predetermined second monitoring period. The wheel speed signal is monitored for a turning point of the ruck signal and a start of the acceleration signal. The oscillation imposed on the vehicle wheel is identified as a braking-induced vibration, and slip control is not carried out when the turning point of the ruck signal and the re-acceleration of the wheel are detected.

10 Claims, 2 Drawing Sheets

(56) References Cited

U.S. PATENT DOCUMENTS

| | | | |
|---|---|---|---|
| 4,320,460 A * | 3/1982 | Brearley | B60T 8/17613 |
| | | | 303/158 |
| 4,850,656 A * | 7/1989 | Ise | B60T 8/175 |
| | | | 303/192 |
| 5,105,359 A | 4/1992 | Okubo | |
| 5,148,368 A | 9/1992 | Satomi | |
| 5,567,024 A | 10/1996 | Johnson | |
| 5,615,935 A * | 4/1997 | Beyer | B60T 8/1769 |
| | | | 303/143 |
| 5,952,564 A | 9/1999 | Naito et al. | |
| 5,964,509 A | 10/1999 | Naito et al. | |
| 2002/0002435 A1 | 1/2002 | Ohtsu | |

FOREIGN PATENT DOCUMENTS

| | | |
|---|---|---|
| DE | 3440244 A1 | 5/1986 |
| DE | 4018991 A1 | 12/1990 |
| DE | 4025045 A1 | 2/1991 |
| DE | 4028193 C1 | 2/1992 |
| DE | 19722174 A1 | 12/1997 |
| DE | 102008003874 A1 | 7/2009 |
| EP | 1055575 A2 | 11/2000 |
| KR | 100220982 B1 | 9/1999 |

* cited by examiner

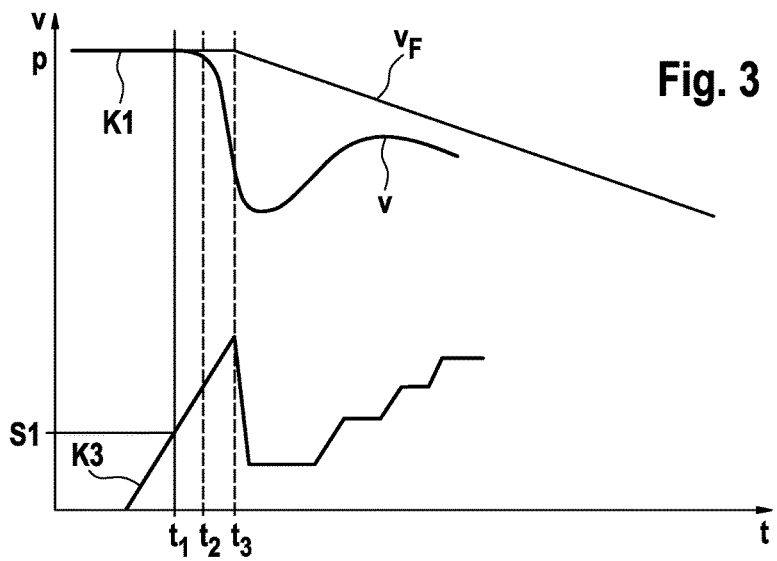
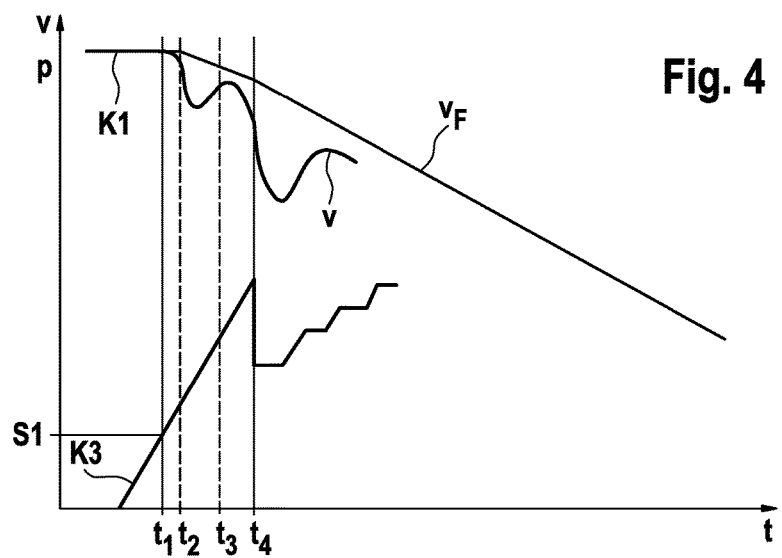

METHOD FOR AVOIDING FALSE EXCITATIONS OF A SLIP CONTROL SYSTEM OF A BRAKE SYSTEM OF A VEHICLE

CROSS REFERENCE TO RELATED APPLICATIONS

This U.S. patent application claims the benefit of PCT patent application No. PCT/EP2015/064973, filed Jul. 1, 2015, which claims the benefit of German patent application No. 10 2014 212 984.2, filed Jul. 3, 2014, both of which are hereby incorporated by reference.

TECHNICAL FIELD

The invention concerns a method for avoiding false excitations of a slip control system of a brake system of a vehicle in which slip control can be performed on at least one vehicle wheel.

BACKGROUND

There are situations in which false excitations of a slip control system can occur, if for example the oscillations in a wheel speed signal of a vehicle wheel are falsely interpreted as slip, and the slip control system responds thereto with slip control.

Such wheel oscillations can occur for example owing to a relative displacement between the wheel suspension with vibration damping and the structure of the vehicle, and indeed not only owing to a vertically running spring travel, but also owing to spring travel in the longitudinal direction of the vehicle. If the vehicle wheel is displaced in the longitudinal direction of the vehicle, then the detected wheel speed changes because of the displacement relative to the structure of the vehicle. Said difference between the wheel speed and the speed of the vehicle can result in falsely detected slip. Furthermore, it has been determined that such a vibration of the vehicle wheel in the longitudinal direction of the vehicle can be initiated by a rapid modulation of the brake pressure at the wheel brake of the vehicle wheel. Therefore, it must be assumed therefrom that a rapid rise in brake pressure can result in oscillations of the wheel speed signal and therefore there is a risk that the slip control falsely detects such a wheel state as slip.

Therefore, such a slip control system must recognize an actual slip and must determine the value thereof very accurately.

Thus, there is a conflict with slip control, whereby on the one hand said slip control should already be used sensitively for a small slip in order to avoid large slips, followed by deep pressure reduction phases, and to avoid an inhomogeneous deceleration profile, but on the other hand the slip control may not be triggered falsely, if for example the slip detected by the slip control system is only the result of a wheel vibration and said detected "slip" would also disappear without slip control. The conflict is that the first objective of sensitive slip control requires sensitive slip control thresholds, whereas the second objective to avoid a "phantom slip" would require insensitive slip control thresholds.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The object of the invention is to provide a method mentioned above that avoids a false stimulation for a falsely detected slip. Falsely detected slip can be detected owing to a braking-induced vibration.

Avoiding false excitations of a slip control system of a brake system of a vehicle, in which slip control can be performed on at least one vehicle wheel, comprises monitoring a wheel speed signal for a predetermined first monitoring period regarding the start of a negative half-wave of an oscillation imposed on the vehicle wheel if a brake pressure gradient initiated by a brake application rises above a predetermined threshold. The wheel speed signal is monitored for a turning point of a ruck signal derived from the wheel speed signal. The wheel speed signal is also monitored for the start of an acceleration signal, indicating the re-acceleration, and derived from the wheel speed signal during a predetermined second monitoring period following the point in time of the start of a detected negative half-wave of the speed signal. When a turning point of the ruck signal and a re-acceleration of the wheel are detected during the predetermined second monitoring period, the oscillation imposed on the vehicle wheel is identified as a braking-induced vibration and slip control of the vehicle wheel is not carried out.

A hard brake application with a steep pressure build-up gradient a vibration induced by a brake pressure gradient, i.e. induced by a braking pressure, is expected that should not be detected as slip by the slip control system and therefore the slip control system should not respond sensitively to said vibration in the sense of slip control. Only if it is ensured that the detected slip is not caused by a braking-induced vibration can the slip control perform control sensitively again in the usual manner.

If there is a braking-induced vibration, it is decided whether the measured wheel speed signal corresponds to an expected signal profile. For this purpose, a check is first made as to whether a brake pressure gradient initiated by a brake application rises above a predetermined threshold, i.e. there is a high brake pressure gradient that could result in a first negative half-oscillation of the wheel speed signal within a first monitoring period.

A check as to whether detection of such a negative half-wave indicates a slip-indicating decrease in speed is carried out following the point in time of the detected half-wave during a second monitoring period. For this purpose, a check is made as to whether the ruck signal derived from the wheel speed signal has a turning point and the acceleration signal derived from the wheel speed signal indicates the start of a re-acceleration. A check is thus made as to whether the wheel acceleration profile during the second monitoring period has a reversal point corresponding to a sinusoidal oscillation and the wheel pressure profile has a turning point corresponding to a sinusoidal oscillation. If said criteria are met, the oscillation of the wheel speed signal starting with the detected negative half-wave is identified as a braking-induced vibration and therefore no slip control is carried out.

According to one configuration of the invention, the state of a vehicle wheel is improved in respect of the vibration state thereof by monitoring the slip signal determined from the wheel speed signal and the speed of the vehicle during step b of the method, and the oscillation imposed on the vehicle wheel is identified as a braking-induced vibration if in addition the slip signal does not reach a predetermined slip threshold. The onset of slip during the second monitoring period is compared with the value of a maximum anticipated slip.

In the event of the start of a negative half-wave during the first monitoring period the control thresholds of the slip control system are increased, i.e. changed to "insensitive", so that initially slip control is not carried out.

According to a further configuration of the invention, the oscillation imposed on the vehicle wheel is not identified as a braking-induced vibration if no re-acceleration of the acceleration signal derived from the wheel speed signal is detected during a predetermined first time segment of the second monitoring period. Said first time segment preferably has a duration of half the second monitoring period when taking into account a signal delay.

Furthermore, according to a development the oscillation imposed on the vehicle wheel is not identified as a braking-induced vibration if no turning point of the ruck signal derived from the wheel speed signal is detected during a predetermined second time segment of the second monitoring period. Said second time segment is preferably shorter than the first time segment and has a duration, for example, of a quarter of the second monitoring period when a signal delay is taken into account.

In accordance with a development, the raised control thresholds are reset back to "sensitive" if the criteria of a turning point of the ruck signal and the start of the acceleration signal do not occur.

Finally, according to a configuration, it is provided that the predetermined threshold is determined depending on the wheel pressure or depending on a filtered wheel pressure signal. The current pressure level from which the pressure build-up gradient is produced can thus be taken into account.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3 shows a t-v/p diagram for illustration of a third embodiment of the method according to the invention; and FIG. 4 shows a t-v/p diagram for illustration of a fourth embodiment of the method according to the invention.

DETAILED DESCRIPTION

A vehicle with a brake system comprising a slip control system is assumed below, wherein the vehicle wheels are slip-controlled by the slip control system. The vehicle wheels are suspended on a wheel support with vibration damping, which for its part can be displaced together with the vehicle wheel relative to the structure of the vehicle and is thereby able to vibrate.

Slip, which is determined by means of a difference between the peripheral wheel speed and the speed of the vehicle, can occur on such a vehicle wheel. As mentioned above, there are situations in which false excitations of the slip control system can occur if for example the oscillations in a wheel speed signal are falsely interpreted as slip and the slip control system responds thereto with slip control. In particular, owing to vibrations of the vehicle wheels in the longitudinal direction of the vehicle, which can be initiated by a rapid rise in brake pressure, there is a risk that the slip control system falsely detects said vibrations as slip.

Therefore, such vibrations must be recognized as braking-induced vibrations, so that false control is not carried out by the slip control system.

Figure 1:
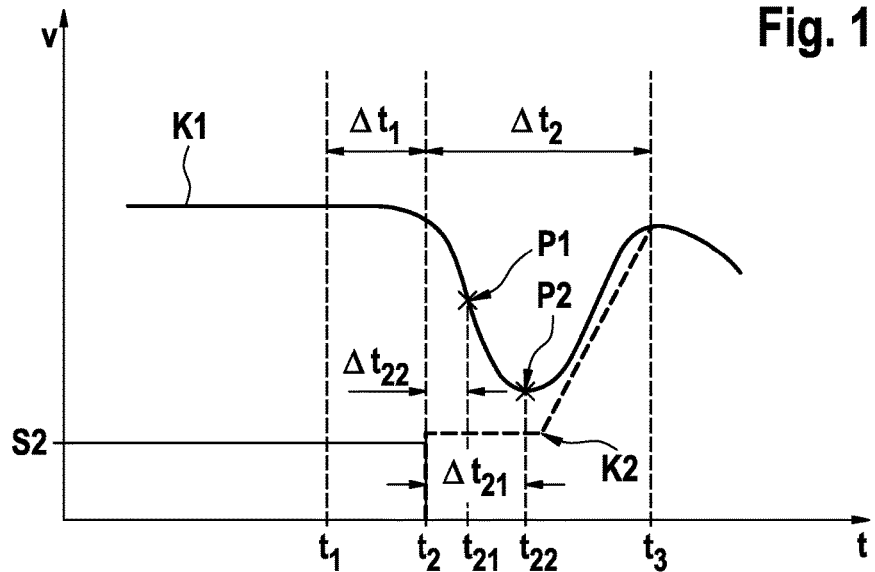
FIG. 1 shows a t-v diagram for illustration of the method according to the invention.

The wheel speed signal that is produced by means of a known wheel sensor system is used for the recognition of such brake pressure induced vibrations of a vehicle wheel. Such a wheel speed signal v is represented in FIG. 1 as graph K1.

Figure 2:
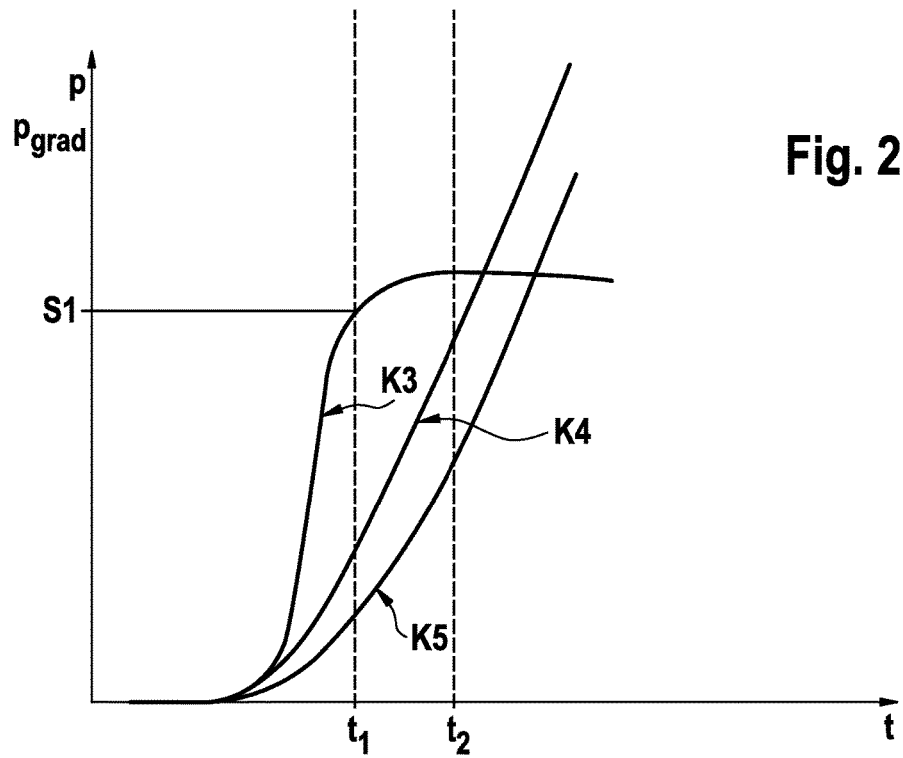
FIG. 2 shows a t-p diagram for illustration of a second embodiment of the method according to the invention.

The method begins with monitoring the profile of the brake pressure gradient $p_{grad}$ represented in FIG. 2 by the graph K3. With said brake pressure gradient $p_{grad}$ according to graph K3, in FIG. 2 the profile of the wheel brake pressure p is also represented as graph K4 and a profile of the filtered wheel brake pressure $p_f$ is also represented as graph K5.

If at the point in time $t_1$ said brake pressure gradient $p_{grad}$ exceeds a threshold S1, which is determined as a function of the filtered brake pressure $p_f$, a first monitoring period $T_1$ of 30 ms starts at said point in time $t_1$. During said first monitoring period $T_1$, the wheel speed signal v is checked regarding the start of a negative half-wave of an oscillation imposed on the vehicle wheel. According to FIG. 1, such a half-wave of the wheel speed signal v begins after a period of time $\Delta t_1$ at the point in time $t_2$. For said period of time $\Delta t_1$, $\Delta t_1 \le T_1$ applies. If no start of a negative half-wave is detected during said first monitoring period $T_1$, the slip control system begins to perform control using the systematic control thresholds, as no disruptive oscillation is expected.

With the detection of a half-wave at the point in time $t_2$, a second monitoring period $T_2$ of 80 ms starts. Said second monitoring period $T_2$ is used for checking whether the detected half-wave is induced by a brake pressure gradient, i.e. is caused by braking-induced vibration, and therefore no control may be performed by the slip control system because of a falsely identified slip.

Owing to the detection of the start of the negative half-wave, it is now initially assumed that it is a braking-induced vibration, and the control thresholds of the slip control system are therefore changed to "insensitive", i.e. they are increased. A check is made using further criteria as to whether it is actually a braking-induced vibration, and—if this is not the case—the increased control thresholds are changed back to the normal values thereof again, i.e. back to "sensitive".

This case is illustrated in the t-v/p diagram according to FIG. 3: because of the threshold value S1 being exceeded at the point in time $t_1$ by the brake pressure gradient $p_{grad}$ (graph K3) owing to the steep rise thereof, the first monitoring period $T_1$ begins. Within said monitoring period $T_1$, the start of a negative half-wave of the wheel speed signal v (graph K1) is detected at the point in time $t_2$. From said point in time $t_2$, the onset of control of the slip control system is inhibited owing to the increased control thresholds. During the subsequent second monitoring period $T_2$, which ends at the point in time $t_3$, the further criteria are not detected. Thus a braking-induced vibration is not assumed, but an actually existing slip. The slip control thereby begins at the point in time $t_3$ with the control thresholds again reduced, i.e. the sensitive control thresholds.

If there is a braking-induced vibration following the detection of a negative half-wave, a check is made as to whether during said second monitoring period $T_2$ the wheel speed signal v indicates a turning point of a ruck signal derived from the wheel speed signal and the start of an acceleration signal indicating the re-acceleration and derived from the wheel speed signal. In addition, a slip signal K2 (cf. FIG. 1) determined from the wheel speed signal v and the speed of the vehicle is compared with the value of a maximum anticipated slip, i.e. with a slip threshold S2.

Said criteria for recognizing a braking-induced oscillation of the wheel speed signal v are met according to FIG. 1. Thus, at the point in time $t_{21}$ a turning point P1 (corresponding to a turning point of a sinusoidal oscillation) of the ruck signal j derived from the wheel speed signal v is detected, and then at the point in time $t_{22}$ a reversal point P2 (corresponding to a reversal point of a sinusoidal oscillation) is detected, wherein the reversal point P2 indicates the start of the re-acceleration of the acceleration signal derived from the wheel speed signal v. Finally, the slip K2 does not reach the predetermined slip threshold S2.

This ensures that the negative half-wave of the wheel speed signal v occurring in the first monitoring period $T_1$ is braking-induced and therefore brake slip control of the slip control system is not carried out.

This case is also shown by the t-v/p diagram of FIG. 4: because the threshold value S1 is exceeded at the point in time $t_1$ by the brake pressure gradient $p_{grad}$ (graph K3) owing to the steep rise thereof, the first monitoring period $T_1$ begins. Within said monitoring period $T_1$, the start of a negative half-wave of the wheel speed signal v is detected at the point in time $t_2$. From said point in time $t_2$, the onset of control by the slip control system is inhibited owing to the increased control thresholds. During the subsequent second monitoring period $T_2$, which ends at the point in time $t_3$, both a turning point and a reversal point are detected. Thus a braking-induced vibration is assumed. The normal slip control only starts in the next half-wave at the point in time $t_4$. The profile of the speed of the vehicle $v_F$ is also plotted in this diagram of FIG. 4.

If one of said three criteria are not met during the second monitoring period $T_2$, the slip control system assumes therefrom that there is slip. The half-wave of the wheel speed signal v represented in FIG. 1 changes at the point in time $t_{22}$ into a positive half-wave, which ends at the point in time $t_3$. The period of time $\Delta t_2$ between the two points in time $t_2$ and $t_3$ does not exceed the second monitoring period $T_2$.

Also, the oscillation imposed on the vehicle wheel is then not identified as a braking-induced vibration if no re-acceleration of the acceleration signal derived from the wheel speed signal is detected during a predetermined first time segment $T_{21}$ of the second monitoring period $T_2$. The duration of said first time segment $T_{21}$ is preferably half of the second monitoring period $T_2$ taking into account a signal delay. According to FIG. 1, said re-acceleration of the vehicle wheel occurs at the point P2, i.e. after a period of time $\Delta t_{21} = t_{22} - t_2$, to which $\Delta t_{21} \leq T_{21}$ applies, following the point in time $t_2$.

Furthermore, the oscillation imposed on the vehicle wheel is also not identified as a braking-induced vibration if no turning point P1 of the ruck signal j derived from the wheel speed signal v is detected during a predetermined second time segment $T_{22}$ of the second monitoring period $T_2$. Said second time segment $T_{22}$ is shorter than the first time segment $T_{21}$ and its duration, taking into account a signal delay, is a quarter of the second monitoring period $T_2$. According to FIG. 1, the time difference $\Delta t_{22} = t_{21} - t_2$ between the turning point P1 and the point in time $t_2$ meets the condition: $\Delta t_{22} \leq T_{22}$.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A method for avoiding false excitations of a slip control system of a brake system of a vehicle, the method comprising:
   monitoring a wheel speed signal for at least one wheel for a predetermined first monitoring period for the start of a negative half-wave of an oscillation imposed on the vehicle wheel when a brake pressure gradient initiated by a brake application rises above a predetermined threshold;
   deriving a nick signal from the wheel speed signal;
   deriving an acceleration signal from the wheel speed signal during a predetermined second monitoring period following the point in time of the start of a detected negative half-wave of the speed signal;
   monitoring the wheel speed signal for a turning point of the nick signal and a start of the acceleration signal indicating the re-acceleration; and
   identifying the oscillation imposed on the vehicle wheel as a braking-induced vibration, wherein slip control of the vehicle wheel is not carried out when a turning point of the ruck signal and the re-acceleration of the wheel are detected.

2. The method of claim 1, wherein monitoring of the wheel speed signal further comprises the step of determining a slip signal from the wheel speed signal and monitoring the speed of the vehicle, and identifying the oscillation imposed on the vehicle wheel as a braking-induced vibration when the slip signal does not reach a predetermined slip threshold.

3. The method of claim 1, further comprising increasing the control thresholds of the slip control system upon the detection of a negative half-wave.

4. The method of claim 1, wherein the oscillation imposed on the vehicle wheel is not identified as a braking-induced vibration when no turning point of the nick signal derived from the wheel speed signal is detected during a predetermined second time segment of the second monitoring period.

5. The method of claim 1, wherein the oscillation imposed on the vehicle wheel is not identified as a braking-induced vibration if no re-acceleration of the acceleration signal derived from the wheel speed signal is detected during a predetermined first time segment of the second monitoring period.

6. The method of claim 5, wherein the control thresholds are reset when a braking-induced vibration is not identified.

7. The method of claim 5, wherein the second time segment is shorter than the first time segment.

8. The method of claim 5, wherein taking into account a signal delay, the first time segment corresponds to half of the second monitoring period.

9. The method of claim 5, wherein taking into account a signal delay, the second time segment corresponds to a quarter of the second monitoring period.

10. The method of claim 1, wherein predeterming the threshold further comprises determining the threshold as a function of one of: the wheel pressure and a filtered signal of the wheel pressure.

* * * * *